United States Patent
Wallack et al.

(10) Patent No.: US 8,519,022 B2
(45) Date of Patent: Aug. 27, 2013

(54) INK EXTENDERS AND INKS UTILIZING ORGANIC BASED RESINS

(71) Applicant: International Paper Company, Memphis, TN (US)

(72) Inventors: David Wallack, Hillsboro, OR (US); Doug Miller, Milwaukie, OR (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 13/774,074

(22) Filed: Feb. 22, 2013

(65) Prior Publication Data

US 2013/0160673 A1    Jun. 27, 2013

Related U.S. Application Data

(62) Division of application No. 12/767,859, filed on Apr. 27, 2010, now Pat. No. 8,383,705.

(51) Int. Cl.
| | |
|---|---|
| *C09D 103/00* | (2006.01) |
| *C09D 103/02* | (2006.01) |
| *C08K 5/05* | (2006.01) |
| *C08K 5/17* | (2006.01) |
| *C08L 3/00* | (2006.01) |

(52) U.S. Cl.
USPC ........ 523/161; 524/221; 106/31.75; 106/31.6

(58) Field of Classification Search
USPC ........ 106/31.75, 31.6; 524/47, 221; 523/161
See application file for complete search history.

(56) References Cited

U.S. PATENT DOCUMENTS

| | | | |
|---|---|---|---|
| 5,569,529 A | 10/1996 | Becker et al. | |
| 5,690,723 A * | 11/1997 | Sano et al. | .............. 106/31.75 |
| 6,613,417 B1 | 9/2003 | Banzai | |
| 6,815,474 B2 * | 11/2004 | Malanga et al. | .............. 523/414 |
| 8,383,705 B2 | 2/2013 | Wallack et al. | |
| 2009/0246701 A1 | 10/2009 | Inno et al. | |
| 2010/0179248 A1 | 7/2010 | Esser et al. | |

FOREIGN PATENT DOCUMENTS

| | | |
|---|---|---|
| EP | 0750026 | 12/1996 |
| JP | 2004285227 | 10/2004 |
| JP | 2004292746 | 10/2004 |
| WO | 2009004078 | 1/2009 |

* cited by examiner

*Primary Examiner* — Satya Sastri
(74) *Attorney, Agent, or Firm* — Thomas W. Ryan, III

(57) ABSTRACT

An extender for flexographic and other ink compositions and inks using such extender where potato starch serves as the ink carrier and an emulsion resin. The use of potato starch provides for a readily available, cost effective, substantial and environmentally friendly alternative to petroleum and soy based resins.

6 Claims, No Drawings

INK EXTENDERS AND INKS UTILIZING ORGANIC BASED RESINS

RELATED U.S. APPLICATION DATA

Division of application Ser. No. 12/767,859, filed on Apr. 27, 2010, now U.S. Pat. No. 8,383,705.

TECHNICAL FIELD

This invention relates generally to ink compositions for printing and the like, and more particularly to an ink composition that utilizes organic based resins, namely potato starch.

BACKGROUND

Virtually all consumer products are sold in packages, such as cardboard cartons, boxes, and other types of containers. A package has two very distinguishing features: a structural design and a graphical design. The structural design of a package is defined by the package's structural features, such as the dimensions, geometric shape, and material of the package. The graphical design of a package is defined by the colors, artwork, and other images applied thereto. The graphical design preferably identifies the packaged product in a manner which is aesthetically appealing to potential consumers.

A package is typically formed from a sheet of corrugated board, carton board, or other work material upon which a graphical design is applied. The graphical design may be applied by many known processes. For example, a sheet having a design may be laminated to the package, or the package itself may be printed.

One common printing method is that of flexography. A flexographic print is made by creating a positive mirrored master of the required image as a 3D relief in a rubber or polymer material. Flexographic plates can be created with analog and digital platemaking processes. The image areas are raised above the non-image areas on the rubber or polymer plate. The ink is transferred from the ink roll which is partially immersed in the ink tank. Then it transfers to the anilox roll (or meter roll) whose texture holds a specific amount of ink since it's covered with thousands of small wells or cells that enable it to meter ink to the printing plate in a uniform thickness evenly and quickly (the number of cells per linear inch can vary according to the type of print job and the quality required). To avoid getting a final product with a smudgy or lumpy look, it must be ensured that the amount of ink on the printing plate is not excessive. This is achieved by using a scraper, called a doctor blade. The doctor blade removes excess ink from the anilox roller before inking the printing plate. The substrate is finally sandwiched between the plate and the impression cylinder to transfer the image.

Components of the composition of a flexographic ink may include but are not limited to: a vehicle such as a solvent or water; a coloring element such as a pigment, pigment grinding, and letdown vehicles in colloidal, solution, or emulsion form; and other components which may include but are not limited to wax, pH control agents, viscosity modifiers, antifoamers, dispersants, antimicrobial agents, ink transfer agents, and drying speed modification agents. The vehicle may contain a combination of acrylic, maleic, fumaric, or other resins.

Water based flexographic inks typically contain acrylic polymers to give the ink good transfer, stability, and resolubility when applied to a substrate, such as corrugated board on constituent linerboard. The acrylic polymers are conventionally produced from petroleum feedstock. Use of such acrylic polymers introduce several concerns, including: 1) the supply and pricing of petroleum is quite volatile and subject to disruption from external events 2) petroleum is a fossil fuel available in finite quantities, i.e., it is a non-renewable resource and its supply cannot be sustained indefinitely 3) the use of fossil fuels increases carbon footprint and subsequent environmental damage.

Alternative polymers to petroleum based acrylic polymers used in inks are available and known in the industry. One prime example of a non-petroleum based ink polymer is soy protein. However, use of soy protein as a biofuel and foodstuff compete with its use in flexographic inks and such other uses are economically preferred. As with petroleum based polymers, this also gives rise to significant fluctuations in supply and pricing.

Therefore, there exists a need for a polymer that is renewable and otherwise environmentally friendly, can be easily sourced and is not sensitive to fluctuations in pricing due to supply and demand from other uses.

BEST MODE FOR CARRYING OUT THE INVENTION

Potatoes grown in the United States and most other countries are generally grown for food. In addition to being sold whole, potatoes are processed into a variety of food products. One byproduct of such potato processing is potato starch. Starch water is created when potatoes are cleaned, sliced, diced and cut, with high pressure water, into familiar shapes as French fries or potato chips. Some potato processing plants ship starch water directly to downstream users or refiners in large tank cars. Potato plants located further away from secondary users, produce a concentrated starch semi-dry product that is more economical to ship.

As reclaimed potato starch is a by-product of food processing for potatoes that are grown are for human food consumption, the starch does not alternatively compete for its use as a bio based fuel or directly into industrial markets. Industrial starches have primarily three sources the largest is corn, second potato and third tapioca (sourced in Asia, Africa, So. America). Of the three, only raw potato starch in the U.S. is a by-product of food potato processing. Corn and tapioca supplies go directly into industrial starch products or, depending upon supply and market conditions, may be diverted into bio-fuels, food/feed products, or pharmaceuticals. Corn used in starch manufacturing directly competes with food and feed use of harvested corn. The competing uses of corn divert the supply into and out of markets depending upon the pricing pressures at that time. Recently, when corn became a valued resource for biofuels, the supply of corn into food/feed markets decreased and prices increased. Therefore polymer derived from potato starch overcomes the disadvantages of both petroleum-based and sustainable (i.e., soy-based) polymers previously discussed herein. Further, if secondary users, such as producers of potato starch based polymers, did not take away the starch water, the potato plants would have a waste disposal issue and incur additional waste treatment costs as well as not being able to capture the added value of the raw material as a sellable commodity. It should also be noted that potato starch does not contain or is formed from VOCs (volatile organic chemicals) and products utilizing potato starch are recyclable and repulpable, as well as, compostable and biodegradable. It should be noted that use of potato starch within the printing industry has been confined to applications on the printing substrate—e.g., paper—and has not been used as part of an ink or other printing composition.

The potato starch is used as part of the "extender" (e.g., non-pigment) portion of the ink composition, in lieu of petroleum-based or other non-renewal polymers. In one embodiment, the extender formula is made up of:

| | |
|---|---|
| Potato Starch | 30.88% (by weight of total extender) |
| MEA (mono-ethanol amine) | 3.86 |
| Solution Resin | 12.02 |
| Antifoam | 0.03 |

The components are mixed together, batch analyzed and then further mixed with the following additional components to achieve the final ink extender composition:

| | |
|---|---|
| Solven | 13.35 (percent of total extender) |
| Potato Starch | 39.69 |
| Antifoam | 0.07 |
| Antimicrobial | 0.10 |

The extender portion of the present invention should contain at least 48% weight percent of potato starch, and preferably 48 to 96% weight percent, based on the total weight of the extender composition. The potato starch functions as a carrier and an emulsion resin in the final ink composition, as such emulsion resins are used and understood in the art. One commercially available brand of potato starch that we have found provides superior results for the disclosed application is Westcote 3090 (Western Polymer Corp., Moses Lake, Wash.). This particular starch formulation is highly substituted (having many hydrophilic groups attached to the polymer backbone) and has qualities, such as high peak viscosity and evenly substituted molecules that tend to hydrate at the same time, that are well suited for use in the disclosed ink applications. Nonetheless, while Westcote 3090 is a preferred starch, most any type of potato starch may be used for the applications discussed herein.

The final ink should have a pH of from 9.0 to 10.0, preferably 9.5 to 9.9. A basic compound, such as an amine, may be added to adjust the pH. Monoethanol amine is a preferred amine that increases pH of the extender. One antifoam agent that can be utilized is DF-66 (Air Products, Allentown, Pa.). One antimicrobial that may be used is Nuosept 498 (International Specialty Products, Wayne, N.J.).

The extender should contain at least 6% weight percent solution resin, preferably 12 to 24% weight percent. The solution resin is a polymer that is soluble in water and assists in transferring a smooth and continuous layer of ink during the printing process. It also allows the ink composition to be cleaned up relatively easily with water in a dried or wet state. One solution resin is UNI-REZ 8170, produced by Arizona Chemicals of Jacksonville, Fla.

A final ink composition comprises a pigment dispersion with the extender and other constituent components known in the art. One such example is:

| | |
|---|---|
| Ink extender: | 29.0% (by weight of final ink composition) |
| Pigment dispersion | 57.5 |
| Wax | 1.5 |
| Polypropylene Glycol | 1.0 |
| Solvent | 11.0 |

The final ink composition should contain at least 25% weight percent of the ink extender, and preferably between 29 to 60% weight percent.

Pigment dispersion are generally sold commercially as the colored pigment dispersed with soy protein. Of course, such pigments are provided in a variety of colors, tones and hues, depending on the need for the final ink color. The pigment dispersion should be included in an amount of at least 3% by weight, preferably from 8 to 60%, depending upon the color desired. An aqueous pigment dispersion is preferred for ease of handling. Other pigment formulations, whether disbursed or otherwise, as known in the art may be used.

One wax that may be used is Ultra Lube D-806 (Keim-Additec Surface USA, Wilmette, Ill.). Wax is included at a preferably amount of 1 to 5% by weight of the final ink composition. Polypropylene glycol is present at preferably 1 to 5% by weight.

The viscosity of the ink composition, as measured in a No. 2 Signature Zahn cup, should be at least 18 seconds, and preferably ranges from 18 to 28 seconds. Water is preferably used as the solvent in both the extender and the final ink composition, but other solvents may be used, thought non-aqueous solvents may detract from the environmental benefits of the composition disclosed herein.

While particular embodiments of the invention have been described in detail herein, it should be understood that various changes and modifications may be made in the invention without departing from the spirit and intent of the invention as defined by the appended claims. While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An admixed ink composition comprising:
   a) an extender component comprising about 48% to 96% by weight of a potato starch, of the total weight of the extender, in said extender component;
   b) a pigment; and
   c) a solvent
wherein the extender component further comprises a monoethanol amine and a solution resin.

2. The ink composition of claim 1 wherein the extender comprises at least about 25% by weight of the total ink composition.

3. The ink composition of claim 1 further comprising a wax and polypropylene glycol.

4. The ink composition of claim 1 having a viscosity of about between 18 to 28 seconds as measured in a No. 2 Signature Zahn cup test.

5. The ink composition of claim 1 wherein the potato starch is of a highly substituted form.

6. The ink composition of claim 1 wherein the potato starch has high peak viscosity and evenly substituted molecules.

* * * * *